United States Patent
Sun

(10) Patent No.: US 8,516,604 B2
(45) Date of Patent: Aug. 20, 2013

(54) METHOD AND APPARATUS FOR MANAGING A USER

(75) Inventor: Jianping Sun, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 242 days.

(21) Appl. No.: 12/869,753

(22) Filed: Aug. 27, 2010

(65) Prior Publication Data
US 2010/0325701 A1    Dec. 23, 2010

Related U.S. Application Data

(63) Continuation of application No. PCT/CN2008/072612, filed on Oct. 7, 2008.

(30) Foreign Application Priority Data

Feb. 28, 2008  (CN) .......................... 2008 1 0065731

(51) Int. Cl.
*H04L 29/06* (2006.01)
(52) U.S. Cl.
USPC .......................................................... 726/28
(58) Field of Classification Search
USPC .............................. 726/2, 4, 17, 21
See application file for complete search history.

(56) References Cited

U.S. PATENT DOCUMENTS

| | | | |
|---|---|---|---|
| 6,088,451 A * | 7/2000 | He et al. ............................ | 726/4 |
| 7,565,416 B1 * | 7/2009 | Shafer et al. .................... | 709/220 |
| 7,822,027 B2 * | 10/2010 | Yadav et al. .................... | 370/389 |
| 2004/0117376 A1 * | 6/2004 | Lavin et al. .................... | 707/10 |
| 2005/0180348 A1 | 8/2005 | Burdick et al. | |
| 2005/0235148 A1 * | 10/2005 | Scheidt et al. ................. | 713/168 |
| 2006/0156403 A1 * | 7/2006 | Haeffele et al. ................ | 726/23 |

FOREIGN PATENT DOCUMENTS

| | | |
|---|---|---|
| CN | 1379873 A | 11/2002 |
| CN | 1464402 A | 12/2003 |
| CN | 101267339 A | 9/2008 |
| EP | 0977399 A2 | 2/2000 |
| EP | 977399 A2 * | 2/2000 |
| EP | 1469633 A1 | 10/2004 |
| WO | 03107133 A2 | 12/2003 |

OTHER PUBLICATIONS

Cisco Systems Inc, Cisco 850 Series and Cisco 870 Series Access Routers Software Configuration Guide, 2005, Cisco Systems Inc.*
Edwin Skau, Junostm Internet Software Access Privilege Configuration Guide, Jul. 26, 2007-Revision 1, 70 Pages.*

(Continued)

*Primary Examiner* — Oscar Louie
*Assistant Examiner* — Christopher C Harris
(74) *Attorney, Agent, or Firm* — Slater & Matsil, L.L.P.

(57) ABSTRACT

In the field of communications, a method and an apparatus for managing a user are provided. The method for managing a user includes the following steps. An identity of a user is authenticated. After the identity authentication of the user is successfully performed, a service router (SR) authenticates a management authority of the user. After the management authority authentication is successfully performed, service configuration management is performed according to the management authority of the user. As compared with the conventional art, by moderately authorizing the lower level user, the technical solutions can reduce the costs of operation and maintenance, improve the efficiency and solve the problem in time, thereby improving customer satisfaction.

20 Claims, 4 Drawing Sheets

(56) References Cited

OTHER PUBLICATIONS

Netgear, "Reference Manual for ProSafe VPN Firewall 200 FVX538", 202-10062-02, Version 1.1, Jan. 2005, 3 pages.*
Rejection decision issued in corresponding Chinese Patent Application No. 200810065731.9; issued Mar. 1, 2012; and partial English translation; total 8 pages.
Recommendation ITU-T X.1244_Overall aspects of countering spam in IP-based multimedia applications.
Revised Text of Draft Recommendation X.ocsip for Determination.
Office Action issued in corresponding Chinese Patent Application No. 200810065731.9; issued Dec. 25, 2009; and partial English translation; total 10 pages.
Second Office Action issued in corresponding Chinese Patent Application No. 200810065731.9; issued Aug. 30, 2011; and partial English translation; total 10 pages.
Written opinion issued in corresponding PCT Patent Application No. PCT/CN2008/072612; issued Jan. 15, 2009; total 5 pages.
Search report issued in corresponding European Patent Application No. 08872929.8; issued Nov. 17, 2011, total 6 pages.

* cited by examiner

METHOD AND APPARATUS FOR MANAGING A USER

CROSS-REFERENCE TO RELATED APPLICATIONS

This application is a continuation of International Application No. PCT/CN2008/072612, filed on Oct. 7, 2008, which claims priority to Chinese Patent Application No. 200810065731.9, filed on Feb. 28, 2008, both of which are hereby incorporated by reference in their entireties.

FIELD OF THE TECHNOLOGY

The present invention relates to the field of communications, and more particularly to a method and an apparatus for managing a user.

BACKGROUND OF THE INVENTION

Currently, a user side of a service router (SR) is generally connected with a large number of cyber cafe users and/or enterprise users. However, Address Resolution Protocol (ARP) conflicts and malicious forgeries may easily occur among a plurality of cyber cafe users connected through the same port, causing normal users unable to access the Internet. When a Layer 2 network of an enterprise is connected to an SR, an access control list (ACL) needs to be frequently adjusted, so as to limit access authorities of users in the enterprise; or the bandwidth and the priority of some users need to be adjusted, so as to provide service guarantees for key businesses. These kinds of adjustment operations may not be implemented unless a cyber cafe administrator or an enterprise network administrator submits an application to an operator and a large number of auditing procedures are successfully performed. In practical operation and maintenance processes, such a case may require a long processing time, resulting in a low efficiency and a high cost.

In the conventional art, a concept of a virtual router (VR) is proposed, that is, a portion of resources of a real router is adopted to form a VR, and the VR is rent to an end user. The end user has the authority to manage the VR, and the user may perform configuration or network formation in order to meet practical requirements for business operations.

In the implementation of the present invention, the inventor finds that the conventional art at least has the following problems.

In the conventional art, the concept of the VR is adopted, that is, a portion of resources of a real router is adopted to form a VR, and the VR is rent to an end user. This approach is rather complex, and it limits the practical application scenarios.

SUMMARY OF THE INVENTION

Accordingly, the present invention is directed to a method and an apparatus for managing a user. The invention can reduce the costs and improve the efficiency of network operation and maintenance.

To achieve the above objectives, in an embodiment, the present invention provides a method for managing a user. The method includes the following steps. An identity of a user is authenticated. After the identity authentication of the user is successfully performed, a management authority of the user is authenticated. After the management authority authentication of the user is successfully performed, the user is permitted to perform service configuration management according to the management authority of the user.

To achieve the above objectives, in another embodiment, the present invention provides an apparatus for managing a user. The apparatus includes a management authority authentication module, configured to authenticate a management authority of a user after identity authentication of the user is successfully performed; and permit the user to perform a management configuration operation within the management authority after the management authority authentication of the user is successfully performed.

Preferably, the management authority authentication module includes one or more of the modules: an ACL configuration authority determining module, an ARP configuration authority determining module, and a Quality of Service (QoS) configuration authority determining module. The ACL configuration authority determining module is configured to determine whether the user has a sufficient ACL configuration authority, the ARP configuration authority determining module is configured to determine whether the user has a sufficient ARP configuration authority, and the QoS configuration authority determining module is configured to determine whether the user has a sufficient QoS configuration authority.

The embodiments of the present invention have following advantages over the conventional art:

By appropriately authorizing the lower level users, the method and apparatus according to the embodiments of the present invention can reduce the costs of operation and maintenance, improve the efficiency and solve the problem in time, thereby improving customer satisfaction.

BRIEF DESCRIPTION OF THE DRAWINGS

To make the technical solution under the present invention clearer, the accompanying drawings for illustrating the embodiments of the present invention or the conventional art are outlined below. Apparently, the accompanying drawings are for exemplary purposes only, and person having ordinary skills in the art can derive other drawings from the accompanying drawings without any creative effort.

DETAILED DESCRIPTION OF THE EMBODIMENTS

The technical solution of the present invention is hereinafter described in detail with reference to the accompanying drawings. It is evident that the embodiments are only exemplary embodiments of the present invention and the present invention is not limited to such embodiments. Person having ordinary skill in the art can derive other embodiments from the embodiments provided herein without creative work, and all such embodiments are covered in the scope of protection of the present invention.

Although the management system is a contributing factor for the low efficiency and high costs displayed in the conventional art, the root cause is that the existing SR fails to provide an effective way of authorizing users to perform self-management functions.

The present invention implements authorization management of resources and properties on a SR. An operator or an upper-level resource supplier classifies and configures various Internet Protocol (IP) resources, interfaces, and bandwidth resources on the SR, and configures authorities for the various resources, and then the operator rents the IP resources, interfaces, and bandwidth resources to cyber cafe users and enterprise users, and at the same time assigns restricted user names and passwords to a cyber cafe administrator or an enterprise network administrator. Each restricted user name is assigned with a certain management authority. The management authority is preset, and may be determined through a subscription or a protocol. For example, a particular IP address segment, interfaces, and bandwidth resources are assigned to an enterprise, and the enterprise can perform management settings within the scope of the assigned resources. However, the enterprise has no right to perform configuration and management setting on resources beyond the assigned scope.

Figure 1:
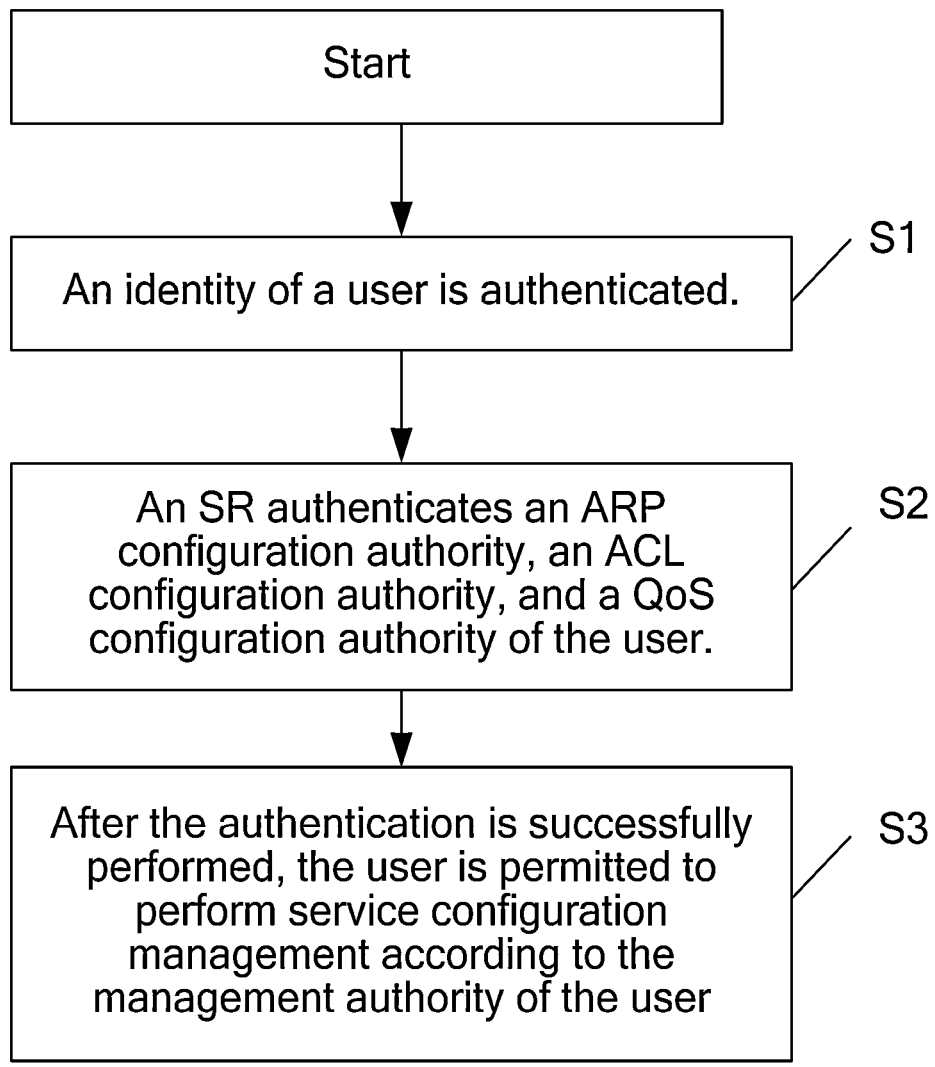
FIG. 1 is a flow chart of a method for managing a user according to an embodiment of the present invention.

The administrator uses the restricted user name and password to log in to the SR, and after a successful authentication, the administrator can perform settings on the particular IP address segment, interfaces and bandwidth resources. For example, the administrator can configure a static ARP to prevent ARP forgery, configure an IP-related ACL to control the access authority of a user, and configure the priority and the bandwidth corresponding to some IP addresses within the particular IP address segment, so as to ensure the QoS. In an embodiment, the present invention provides a method for managing a user. Referring to FIG. 1, the method includes the following steps.

In step S1, an identity authentication is performed on a user. For example, the identity of the user may be authenticated according to a user name and a password input by the user. The input is used to determine whether the user has an authority to perform subsequent configuration management operations. The authentication procedure may be implemented on an SR, or a dedicated authentication server, such as an authentication, authorization, and accounting (AAA) server or a Remote Authentication Dial In User Service (RADIUS) system. After the authentication S1 is successfully performed, the user is allowed to enter a further authentication S2. The identity authentication S1 of the user may also be implemented in other forms instead of using the user name and password, for example, by authenticating an identity of a login user according to an Internet Protocol (IP) address of a user having a management authority, or a Media Access Control (MAC) address of a user having a management authority, or an address of a user having a management authority and setting a legitimate network address within a network segment.

In step S2, management authorities of the user, such as an ARP configuration authority, an ACL configuration authority, and a QoS configuration authority, are authenticated.

The authentication of step S2 may further determines whether the user having configuration authorities has one or more of the ARP configuration authority, the ACL configuration authority, and the QoS configuration authority, and determines thresholds of the ARP configuration authority, the ACL configuration authority, and the QoS configuration authority. The thresholds are preset by an operator or an upper-level network resource supplier.

In step S3, after the above authentication step S2 is successfully performed, the user is permitted to perform service configuration management according to the management authority of the user, that is, the user can perform one or more of ARP, ACL, and QoS configurations within the authorities acquired from the operator or upper-level network resource supplier.

Because the static ARP table and ACL belong to resources of the entire SR, the configured count of the entries of the static ARP table and ACL may be limited for different administrators.

Figure 2A:
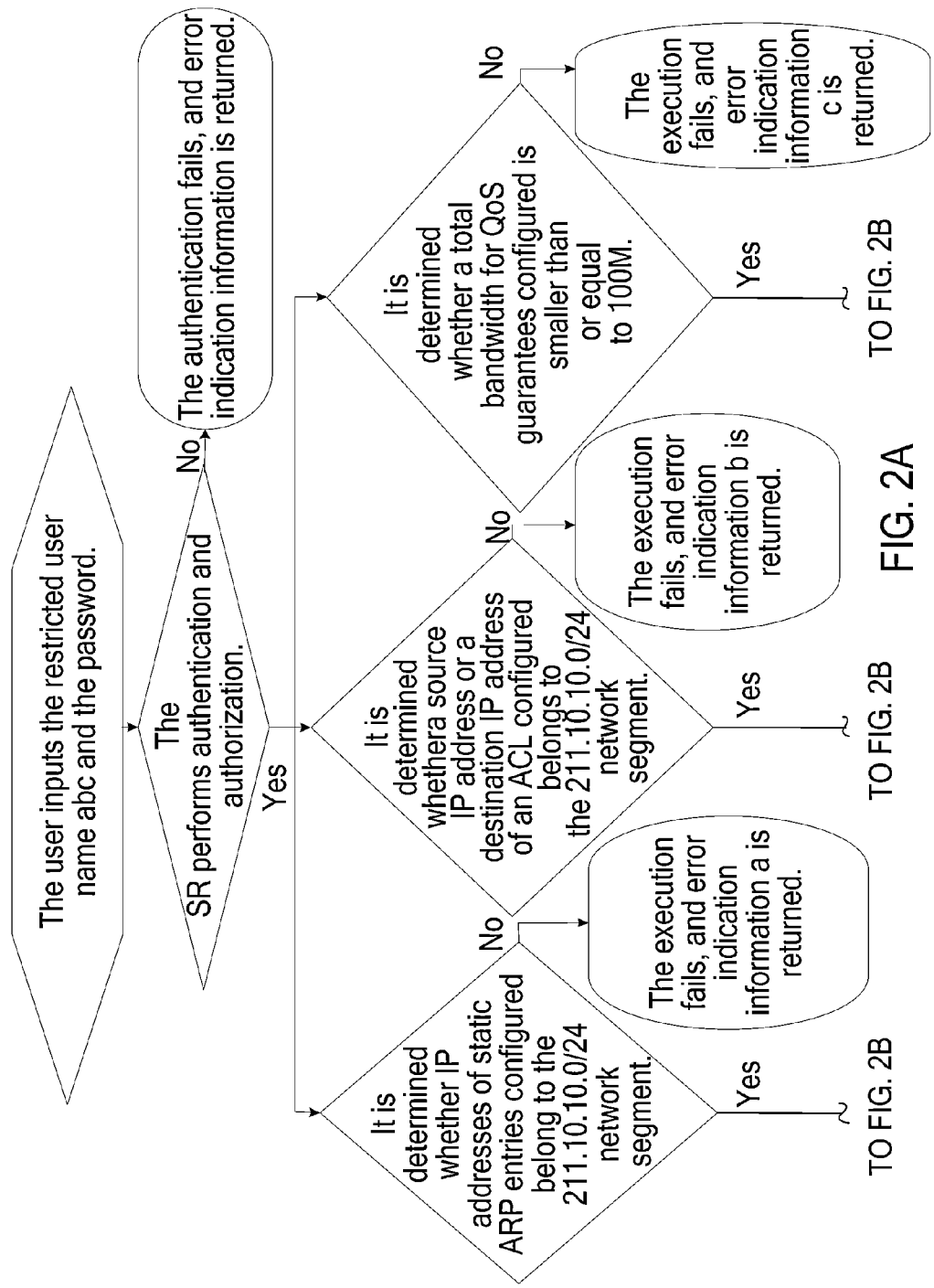
FIG. 2 is an exemplary flow chart of a method for managing a user according to an embodiment of the present invention.
Figure 2B:
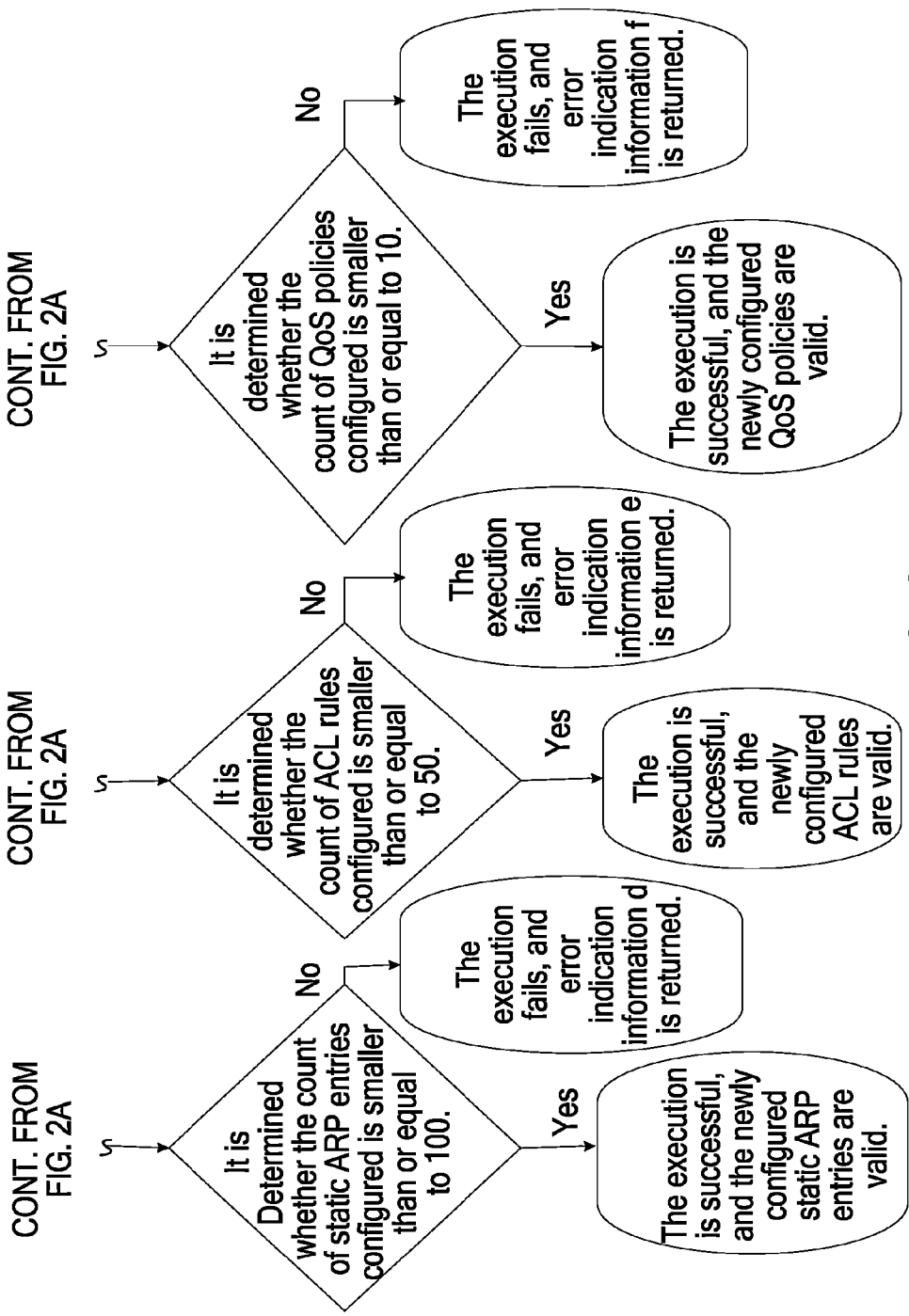

For example, a user rents a 100M interface (Ethernet 0/1) and 255 IP addresses (211.10.10.0/24) from the operator, the operator assigns a restricted user name and password (e.g. user name: abc; and password: 123, respectively) to the user, and the user can log in to the SR to configure 100 static ARPs entries, 50 ACL rules, and 10 QoS policies. The specific management process is shown by example in FIG. 2.

The user logs in on a user interface of the SR, and inputs the restricted user name "abc" and corresponding password "123" for authentication and authorization.

The SR performs management authority authorization and authentication according to the restricted user name and password input by the user; and if the authentication fails, the SR returns error indication information to the user, indicating that the user name or password may be incorrect or invalid; and if the authentication is successful, other authentications on the user continues, including authentications of the ARP, ACL, and QoS configuration authorities.

(1) Authentication on ARP Configuration Authority

The user is allowed to configure static ARP entries and the SR determines whether or not IP addresses of the static ARP entries configured by the user belong to a 211.10.10.0/24 network segment, in which network addresses pre-assigned to the user are. If the IP addresses of the static ARP entries configured by the user do not belong to the 211.10.10.0/24 network segment, in which the network addresses pre-assigned to the user are, the operation fails, and error indication information a is returned. If the IP addresses of the static ARP entries configured by the user belong to the 211.10.10.0/24 network segment, the SR further determines whether a count of static ARP entries configured by the user is smaller than or equal to 100 which is the threshold of the ARP configuration authority provided to the user by the operator. If the count of static ARP entries configured by the user is larger than 100, the configuration of new static ARP entries is denied and thus the operation fails, and error indication information d is returned. However, at this time, the user can still update the existing configuration of the static ARP entries within the threshold of the ARP configuration authority, for example, delete or modify the existing configured static ARP entries. If the count of the static ARP entries configured by the user is smaller than or equal to 100, the configuration of the new static ARP entries is successful, and the newly configured static ARP entries are valid.

(2) Authentication on ACL Configuration Authority

The user is allowed to configure an ACL and SR determines whether or not a source IP address or a destination IP address of the ACL configured by the user belongs to a 211.10.10.0/24 network segment in which network addresses pre-assigned to the user are. If the source IP address or destination IP address of the ACL configured by the user does not belong to the 211.10.10.0/24 network segment in which the network addresses pre-assigned to the user are, the configuration of the ACL fails, and error indication information b is returned; and if the source IP address or the destination IP address of the ACL configured by the user belongs to the 211.10.10.0/24 network segment in which the network addresses pre-assigned to the user are, the SR further determines whether a count of ACL rules configured by the user is smaller than or equal to 50, which is the threshold of the ACL configuration authority provided to the user by the operator. If the count of ACL rules configured by the user is larger than 50, configuration of new ACL rules is denied and thus fails, and error indication information e is returned. However, at this time, the user can still update the existing ACL rules within the threshold of the ACL configuration authority, for example, delete or modify some existing ACL rules. If the count of ACL rules configured by the user is smaller than or equal to 50, the configuration of the new ACL rules is successful, and the newly configured ACL rules are valid.

(3) Authentication on QoS Configuration Authority

The user is allowed to configure a bandwidth for a QoS guarantee and the SR determines whether or not a total bandwidth for QoS guarantees configured by the user is smaller than or equal to 100M. If the total bandwidth for the QoS guarantees configured by the user exceeds 100M, the configuration by the user for the QoS guarantees fails, and error indication information c is returned. If the total bandwidth for the QoS guarantees configured by the user is smaller than or equal to 100M, is the SR further determines whether a count of QoS policies configured by the user is smaller than or equal to 10, which is the threshold of the QoS configuration authority provided to the user by the operator. If the count of QoS policies configured by the user is larger than 10, the configuration of the new QoS policies is denied and thus the operation fails, and error indication information f is returned. However, at this time, the user can still update the existing QoS policies within the threshold of the QoS configuration authority, for example, delete or modify some existing QoS policies. If the count of QoS policies configured by the user is smaller than or equal to 10, the configuration of the new QoS policies is successful, and the newly configured QoS policies are valid.

The authentications on the ARP, ACL and QoS configuration authorities are performed after the authorization and authentication of the user, but the three authentications on ARP, ACL and QoS configuration authorities may be performed concurrently or in any sequence. Alternatively, only a part of the authentications on ARP, ACL and QoS configuration authority may be performed according to the requirements, for example, only the authentication on the ACL configuration authority needs to be performed, to determine whether the user has an authority to configure (modify or delete) some existing ACL entries.

Further, if the threshold configured for a certain item has been reached, after the user having the corresponding management authority logs in, an indication may be set to directly indicate to the user that configuration of a new service or new services cannot be performed, such that after the logging in, the user having the management authority can directly operate within his/her operational authority.

If a task with a higher priority needs to be performed, but the threshold of the corresponding management authority has been reached, a part of the configured objects may be deleted, to satisfy the task with the higher priority, that is, the user having the management authority can manage the already-configured contents.

By appropriately authorizing management rights to the lower level users, the method for managing a user according to the embodiment of the present invention can reduce the costs of operation and maintenance, improve the efficiency and solve the problem in time, thereby improving customer satisfaction.

In another embodiment, the present invention further provides an apparatus for managing a user. The apparatus includes a management authority authentication module, configured to authenticate a management authority of a user after an identity authentication of the user is successfully performed; and permit the user to perform a management configuration (modification or deletion) operation within the management authority after the management authority authentication of the user is successfully performed. The management authority authentication module may further include one or more of the following modules: an ACL configuration authority determining module, an ARP configuration authority determining module, and a QoS configuration authority determining module.

Figure 3:
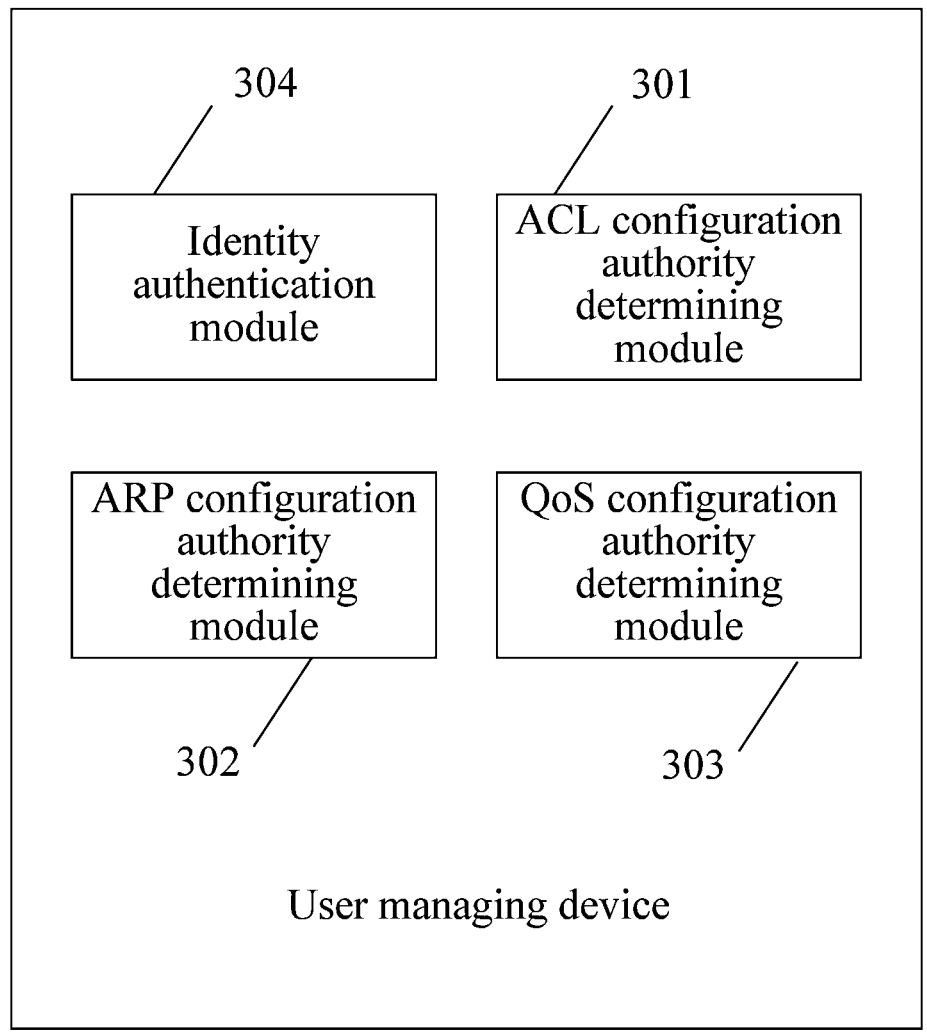
FIG. 3 is a structural block diagram of an apparatus for managing a user according to an embodiment of the present invention.

As shown in FIG. 3, the management authority authentication module of the apparatus for managing a user further includes an ACL configuration authority determining module 301, an ARP configuration authority determining module 302, and a QoS configuration authority determining module 303. The ACL configuration authority determining module 301 is configured to determine whether the user has a sufficient ACL configuration authority, the ARP configuration authority determining module 302 is configured to determine whether the user has a sufficient ARP configuration authority, and the QoS configuration authority determining module 303 is configured to determine whether the user has a sufficient QoS configuration authority. Only after a configuration authority authentication on the user performed by one of the above three configuration authority determining modules 301, 302, and 303 is successfully performed, the user can be permitted to perform a corresponding management configuration operation. For example, if the user intends to configure a new static ARP entry, the user must not exceed the threshold of the ARP configuration authority after the configuration of the new static ARP entry is completed. For example, if the user is only authorized to configure 100 static ARP entries, no more new static ARP entry can be configured once 100 static ARP entries have been configured, but the user may modify or delete the originally or previously configured static ARP entries. The configurations of the QoS policies and the ACL rules are similar to the configurations of the ARP entries.

The determination processes of the ACL configuration authority determining module 301, the ARP configuration authority determining module 302, and the QoS configuration authority determining module 303 may be performed concurrently or in any sequence. Alternatively, only a part of the authentications on the ARP, ACL and QoS configuration authorities may be performed according to the requirements, for example, only the authentication on the ACL configuration authority needs to be performed, to determine whether the user has an authority to configure (modify or delete) some existing ACL entries.

To ensure the security of the management authority of the user, the apparatus for managing a user may further include an identity authentication module 304, configured to determine whether the user has an authority to perform subsequent management configuration operations according to a user name and a password input by the user. Definitely, the identity authentication may also be implemented on other devices, such as an AAA server or a RADIUS system. The identity authentication module 304 may be located on an SR or other network devices.

By appropriately authorizing the lower level user, the apparatus for managing a user according to the embodiment of the present invention can reduce the costs of operation and maintenance, improve the efficiency and solve the problem in time, thereby improving customer satisfaction.

The method and apparatus for managing a user according to the embodiments of the present invention may be accomplished by a software program stored in a machine readable medium. That is to say, the present invention further provides a machine readable storage medium, capable of storing a program for executing a method for managing a user, in which the method includes the following steps: authenticating an identity of a user; after the identity authentication of the user is successfully performed, authenticating a management authority of the user; and after the management authority authentication of the user is successfully performed, permitting the user perform service configuration management according to the management authority of the user.

A method for authenticating the identity of the user includes: authenticating the identity of the user according to a user name and a password input by the user, or authenticating an identity of a login user according to an Internet Protocol (IP) address of a user having a management authority, or a Media Access Control (MAC) address of a user having a management authority, or an address of a user having a management authority and setting a legitimate network address within a network segment.

The authenticating the management authority of the user includes: performing management authority authentication on specific service types managed by the user.

The specific service types managed by the user include one or more of the following configurations: an ARP configuration, an ACL configuration, and a QoS configuration; and the management authority authentication on the specific service types managed by the user correspondingly includes one or more of: an authentication on an ARP configuration authority, an authentication on an ACL configuration authority, and an authentication on a QoS configuration authority.

The authentication on the ARP configuration authority includes: determining whether IP addresses of static ARP entries configured by the user belong to a network segment in which network addresses pre-assigned to the user are, and if the IP addresses of the static ARP entries configured by the user belong to the network segment, determining that the authentication authority is valid. After determining that the IP addresses of the static ARP entries configured by the user belong to the network segment in which the network addresses pre-assigned to the user are, it is further determined whether a count of static ARP entries configured by the user exceeds the threshold of the ARP configuration authority previously provided to the user by an upper-level supplier, and if the count of static ARP entries configured by the user does not exceed the threshold of the ARP configuration authority, it indicates that the user has an authority to continue configuring new static ARP entries.

The authentication on the ACL configuration authority includes: determining whether a source IP address or a destination IP address of an ACL configured by the user belongs to a network segment in which network addresses pre-assigned to the user are, and if the source IP address or the destination IP address of the ACL configured by the user belongs to the network segment, determining that the authentication authority is valid. After determining that the source IP address or the destination IP address of the ACL configured by the user belongs to the network segment in which the network addresses pre-assigned to the user are, it is further determined whether a count of ACL entries configured by the user exceeds the threshold of the ACL configuration authority previously provided to the user by an upper-level supplier, and if the count of ACL entries configured by the user does not exceed the threshold of the ACL configuration authority, it indicates that the user has an authority to continue configuring new ACL entries.

The authentication on the QoS configuration authority includes: determining whether a total bandwidth for QoS guarantees configured by the user exceeds a total QoS bandwidth previously provided to the user by an upper-level supplier, and if the total bandwidth for the QoS guarantees configured by the user does not exceed the total QoS bandwidth, determining that the authentication authority is valid. After determining that the total bandwidth for the QoS guarantees configured by the user does not exceed the total QoS bandwidth previously provided to the user by the upper-level supplier, it is further determined whether a count of QoS policies configured by the user exceeds the threshold of the QoS configuration authority previously provided to the user by the upper-level supplier, and if the count of QoS policies configured by the user does not exceed the threshold of the QoS configuration authority, it indicates that the user has an authority to continue configuring new QoS policies.

One or more of the authentication on the ARP configuration authority, the authentication on the ACL configuration authority, and the authentication on the QoS configuration authority may be performed concurrently or in any sequence.

Through the descriptions of the preceding embodiments, those skilled in the art may understand that the present invention may be implemented by hardware only or by software and a necessary universal hardware platform. Based on such understandings, the technical solution under the present invention may be embodied in the form of a software product. The software product may be stored in a nonvolatile storage medium, which can be a Compact Disk Read-Only Memory (CD-ROM), USB flash drive, or a removable hard drive. The software product includes multiple instructions that enable a computer device (personal computer, server, or network device) to execute the methods provided in the embodiments of the present invention.

Although the present invention has been described through several exemplary embodiments, the invention is not limited to such embodiments. Any modification, equivalent replacement, or improvement made without departing from the spirit and principle of the present invention should fall within the scope of the present invention.

What is claimed is:

1. A method for managing a user, the method comprising:
   authenticating an identity of the user to determine whether the user has an authority to perform a configuration management operation;
   if the identity authentication is successful, authenticating, by a service router, a management authority of the user;
   wherein the authenticating the management authority of the user comprises performing a management authority authentication on an access control list (ACL) configuration when the user configures the ACL;
   wherein the performing the management authority authentication on the ACL configuration comprises determining whether a source IP address or a destination IP address of the ACL configured by the user belongs to a first network segment to which network addresses pre-assigned to the user belong, and determining that the user is permitted to configure the ACL if the source IP address or the destination IP address of the ACL configured by the user belongs to the first network segment; and
   if the management authority authentication is successful, permitting, by the service router, the user to perform a service configuration management operation according to the management authority of the user.

2. The method according to claim 1, wherein the step of authenticating the identity of the user comprises:
   authenticating the identity of the user according to a user name and a password input by the user.

3. The method according to claim 1, wherein authenticating the management authority of the user further comprises:
performing a management authority authentication on an Address Resolution Protocol (ARP) configuration when the user configures a static ARP entry, and/or a Quality of Service (QoS) configuration when the user performs QoS configuration.

4. The method according to claim 3, wherein the management authority authentication on the ARP configuration comprises: determining whether an IP address of the static ARP entry configured by the user belongs to a second network segment in which network addresses pre-assigned to the user are, and determining that the user is permitted to configure the static ARP entry if the IP address of the static ARP entry configured by the user belongs to the second network segment.

5. The method according to claim 4, wherein the service router determines that the user is permitted to configure a new static ARP entry if an IP address of the new static ARP entry configured by the user belongs to the second network segment and if a count of the static ARP entries configured by the user does not exceed a threshold of an ARP configuration authority previously provided to the user by an upper-level supplier.

6. The method according to claim 3, wherein the management authority authentication on the QoS configuration comprises: determining whether a total bandwidth for QoS guarantees configured by the user exceeds a total QoS bandwidth previously provided to the user by an upper-level supplier, and determining the user is permitted to perform the QoS configuration if the total bandwidth for the QoS guarantees configured by the user does not exceed the total QoS bandwidth.

7. The method according to claim 6, wherein the service router determines that the user is permitted to configure a QoS policy if the total bandwidth for the QoS guarantees configured by the user does not exceed the total QoS bandwidth previously provided to the user by the upper-level supplier and if a count of QoS policies configured by the user does not exceed a threshold of a QoS configuration authority previously provided to the user by the upper-level supplier.

8. The method according to claim 3, wherein the management authority authentication on the ARP configuration, the management authority authentication on the ACL configuration, and the management authority authentication on the QoS configuration are performed concurrently or in any sequence.

9. The method according to claim 1, wherein the service router determines that the user is permitted to configure a new ACL entry if a source IP address or a destination IP address of the new ACL entry configured by the user belongs to the first network segment and if a count of ACL entries configured by the user does not exceed a threshold of an ACL configuration authority previously provided to the user by an upper-level supplier.

10. The method according to claim 1, wherein the step of authenticating the identity of the user comprises authenticating an identity of a login user according to an Internet Protocol (IP) address of a user having a management authority.

11. The method according to claim 1, wherein the step of authenticating the identity of the user comprises authenticating an identity of a login user according to a Media Access Control (MAC) address of a user having a management authority.

12. The method according to claim 1, wherein the step of authenticating the identity of the user comprises authenticating an identity of a login user according to an address of a user having a management authority and setting a legitimate network address within a network segment.

13. An apparatus for managing a user, the apparatus comprising:
a user interface, configured to receive a user input for performing a management configuration operation,
an identity authentication circuit, configured to authenticate an identity of the user to determine whether the user has an authority to perform a configuration management operation, and
a management authority authentication circuit, configured to authenticate a management authority of the user if the identity authentication of the user is successful; and to permit the user to perform the management configuration operation within the management authority if the management authority authentication of the user is successful,
wherein the management authority authentication circuit comprises an access control list (ACL) configuration authority determining circuit, configured to determine whether a source IP address or a destination IP address of an ACL configured by the user when the user configures the ACL belongs to a first network segment to which network addresses pre-assigned to the user belong, and determine that the user is permitted to configure the ACL if the source IP address or the destination IP address of the ACL configured by the user belongs to the first network segment.

14. The apparatus according to claim 13, wherein the management authority authentication circuit further comprises a Quality of Service (QoS) configuration authority determining circuit, configured to determine whether the user has a sufficient QoS configuration authority when the user performs QoS configuration.

15. The apparatus according to claim 14, wherein the QoS configuration authority authentication circuit is configured to determine whether a total bandwidth for QoS guarantees configured by the user exceeds a total QoS bandwidth previously provided to the user by an upper-level supplier, and determine the user is permitted to perform the QoS configuration if the total bandwidth for the QoS guarantees configured by the user does not exceed the total QoS bandwidth, determining that authentication on the QoS configuration authority is valid.

16. The apparatus according to claim 15, wherein the QoS configuration authority authentication circuit is further configured to determine whether a count of QoS policies configured by the user exceeds a threshold of a QoS configuration authority previously provided to the user by the upper-level supplier if the total bandwidth for the QoS guarantees configured by the user does not exceed the total QoS bandwidth, and determine that the user is permitted to configure a QoS policy if the count of QoS policies configured by the user does not exceed the threshold of the QoS configuration authority, indicate that the user has an authority to continue configuring a new QoS policy.

17. The apparatus according to claim 13, wherein the ACL configuration authority authentication circuit is further configured to determine whether a count of ACL entries configured by the user exceeds a threshold of an ACL configuration authority previously provided to the user by an upper-level supplier, and if the count of ACL entries configured by the user does not exceed the threshold of the ACL configuration authority, indicate that the user has an authority to continue configuring a new ACL entry.

18. The apparatus according to claim 13, wherein the management authority authentication circuit further comprises an Address Resolution Protocol (ARP) configuration authority determining circuit, configured to determine whether the user has a sufficient ARP configuration authority when the user configures a static ARP entry.

19. The apparatus according to claim 18, wherein the ARP configuration authority authentication circuit is configured to determine whether an IP address of the static ARP entry configured by the user belongs to a second network segment to which network addresses pre-assigned to the user belong, and if the IP address of the static ARP entry configured by the user belongs to the second network segment, determine that the user is permitted to configure the static ARP entry.

20. The apparatus according to claim 19, wherein the ARP configuration authority authentication circuit is further configured to determine whether a count of the static ARP entries configured by the user exceeds a threshold of an ARP configuration authority previously provided to the user by an upper-level supplier, and determine that the user is permitted to configure the static ARP entry if the IP address of the static ARP entry configured by the user belongs to the second network segment and if the count of the static ARP entries configured by the user does not exceed the threshold of the ARP configuration authority.

\* \* \* \* \*